Dec. 30, 1958 J. E. TOWNSEND ET AL 2,866,503
SHEAR APPARATUS
Original Filed March 15, 1952
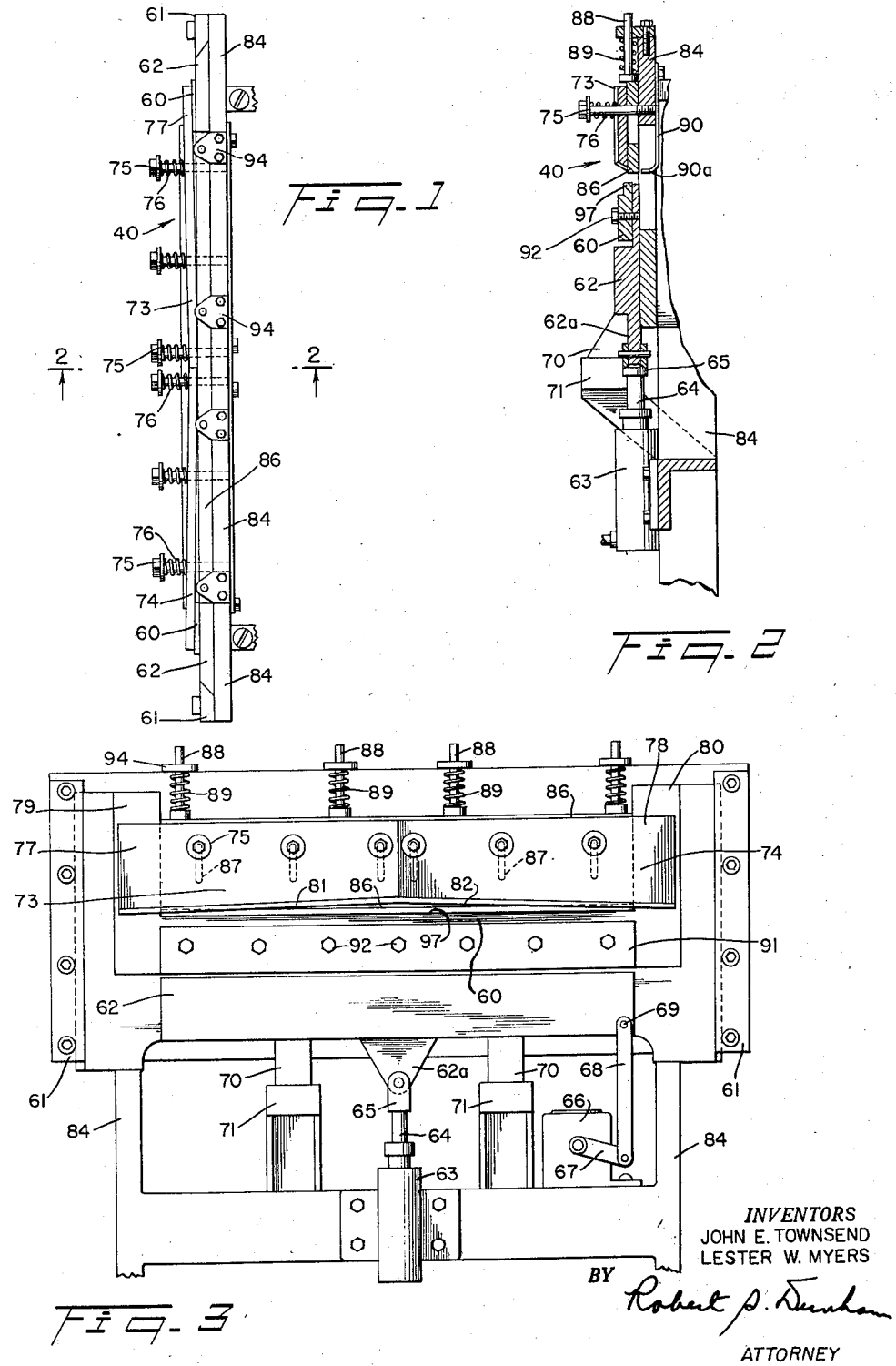
INVENTORS
JOHN E. TOWNSEND
LESTER W. MYERS
BY
Robert P. Dunham
ATTORNEY 2,866,503

SHEAR APPARATUS

John Ernest Townsend, Canton, and Lester William Myers, Massillon, Ohio, assignors to Republic Steel Corporation, Cleveland, Ohio, a corporation of New Jersey Original application March 15, 1952, Serial No. 276,888, now Patent No. 2,811,196, dated October 29, 1957. Divided and this application February 11, 1957, Serial No. 639,494

4 Claims. (Cl. 164—58)

The present application is a division of our copending application, Serial No. 276,888, filed March 15, 1952, now Patent No. 2,811,196 entitled, Method and Apparatus for Delivering Sheet Material.

The present invention relates to shear apparatus, adapted for cutting sheet material and for power operation.

An object of the present invention is to provide improved shear apparatus.

Another object is to provide improved shear apparatus for cutting sheet material.

Another object is to provide shear apparatus including improved means for preventing the material being cut from adhering to the blades.

Another object is to provide shear apparatus including improved means for supporting the blades to confine the cutting action to restricted localities or points.

The foregoing and other objects of the invention are attained, in the apparatus described herein, by providing a vertically movable, power driven blade having a horizontal cutting edge along its upper side, and two vertically stationary blades located in end-to-end relation above the vertically movable blade. Each of the vertically stationary blades has a cutting edge along its lower side, and those edges are inclined slightly downwardly from the adjacent ends of the blades toward their opposite ends. The vertically stationary blades are yieldably supported so that their cutting edges cross the edge of the movable blade at a small angle. As the movable blade travels upward, the vertically stationary blades shift on their support, so the points of intersection travel inwardly along the blades. A stripper bar is provided to clear away any material clinging to the vertically stationary blades when the movable blade moves downward.

In the drawings:

Fig. 1 is a plan view of a shear embodying the invention;

Fig. 2 is a side view chiefly in vertical section taken along the line 2—2 in Fig. 1; and Fig. 3 is a front end elevation view of the shear of Fig. 1.

After the paper leaves a set of crimping rolls (not shown), it is fed out between the blades of a shear generally indicated at 40. When the paper has been fed out a desired amount, the feeding operation is arrested while the shear 40 is operated to cut off a strip of the selected length.

The shear is of a unique construction whereby it may be subjected to long continued use without substantial loss in ability to operate easily and to make a sharp and clean cut every time. Such beneficial results are gained by a construction which provides an action similar in effect to that of hand operated shears, a basic principle of such arrangement being that the shear blades are spring-biased into contact with one another, in such a manner that their tips overlap until the shears are closed. It should also be noted that hand shears do not cut along the whole length of their blades at once but make a single "point" shear or cut which progresses from the heel of the blades to the tip. This action is also realized in the shear arrangement of the present invention.

The shear consists of a U-shaped lower blade 60 (having two wings or vertical extensions 79, 80 best seen in Fig. 3, and a horizontal, straight-line cutting edge 97) and two approximately rectangular upper blades 73 and 74 which are each about one half the length of the lower blade and are arranged end to end above it. The lower blade 60 is fastened to the face of a U-shaped support 62 by means of bolts 92 which are tightened against a thickened reinforcing section 91 of the lower shear blade. The support 62 at the sides of its upright arms, is carried in guide members 61 which are bolted to a framework 84 in a vertical position. These guide members 61 have inwardly sloping edges abutting the sides of the U-shaped support 62, while the sides of the support have a corresponding outward slope or bevel, i. e. to match the slope of guide members 61, in such a manner as to hold the support 62 and the lower shear blade 60 against the framework 84. Thus the guides 61 provide a trackway in which the support may slide vertically.

The support 62 is also movably supported by a lower foot 62a, as described below. That is to say, the support and blade are raised vertically by means of an air operated piston enclosed in a cylinder 63 and connected to the foot 62a by a shaft or piston rod 64 and a pin and clevis coupling 65 as illustrated. For indicating the number of operations of the shear and thus the number of sheets of paper delivered over a given time, there is a counter 66 which is actuated by its arm 67 and a link 68 attached to the lower shear blade support by means of a pin 69. When the shear blade and support are in their lower position, as shown, the support rests on and is supported by blocks of absorbing resilient material 70 which are carried in cup-like supports 71 as clearly illustrated in Figs. 2 and 3.

The supply of air under pressure for the air operated cylinder 63 is controlled by suitable mechanism not shown. It will be apparent to those skilled in the art that other types of fluid-operated means, for example, a hydraulic cylinder, may be used to actuate the shear and may be similarly controlled. Similarly, it will be apparent to those skilled in the art that the lower blade might be operated by other types of motor mechanisms.

The upper blades of the shear 40, namely 73 and 74 previously mentioned, are attached in a generally flatwise but floating manner to the framework 84 of the shear assembly by means of bolts 75 and springs 76, a plurality of the bolts being arranged to pass through each blade into the framework behind it, and each blade being adapted to move on its supporting bolts, i. e., axially of the latter. The springs 76 act between the upper blades 73, 74 and washers under the heads of the bolts 75, to bias the upper blades inwardly against the lower shear blade 60 and against a stripping bar 86 which will be more fully described hereafter. In order to gain progressive shear action, the cutting edges 81 and 82 of upper shear blades 73 and 74 respectively are sloped relative to the horizontal, in such fashion that shearing action will commence at the heels (i. e. outer ends) of the upper blades and work toward their abutting tips. In other words, as seen in Fig. 3, the upper blade edges form a shallow inverted V, such that the cutting action will begin at the edges and work toward the center of a strip of paper.

Attention is also directed to the fact that end portions 77 and 78 of upper blades 73 and 74 respectively, overlap vertical extensions 79 and 80 (Fig. 3) of the U-shaped lower shear blade 60, the portions 79 and 80 being plate-like faces of the upright arms of the lower blade. Since the portions 79, 80 project slightly from the face of the stripping bar 86 toward which the upper blades 73, 74 are urged by the springs 76, the blades actually engage the bar (when the lower blade is down) only at their abutting ends, i. e. at the center of the assembly (as viewed in Fig. 3); each of the upper blades is thus held at a slight angle, when seen in plan (Fig. 1), so that together they form a shallow V which extends inwardly across the lower blade and from which they are adapted to be displaced (against the springs 76) into a straight line relation when the lower blade rises. In the described fashion, with the upper blades spring biased across the center of the cutting edge 97 of the lower blade 60, the cross-tipped action of hand shears is achieved; when the lower blade ascends, it progressively forces the upper blades outwardly (to the left in Figs. 1 and 2) while it progressively engages their edges from the outer ends toward the center. It will be understood, of course, that the end portions 77, 78 of the upper blades 73, 74 are so positioned by the supporting faces 79, 80 as to insure that the end portions of the rising lower blade will pass behind the outer end portions of the upper blades, to commence the progressive shearing action at both ends of the assembly. That is to say, the end portions of the upper blade edges are positively held (by parts 79, 80 of the lower blade structure) from crossing over the lower blade edge and jamming the shear.

The stripping bar 86 previously mentioned, acts to remove paper from the upper blades following the operation of the shear. This bar is in structure a flat plate having slots 87 to allow it to move vertically with respect to bolts 75. The bar or plate 86 is spring biased into its lower position as shown by a plurality of plungers 88, each having its head downwardly pressed against the upper edge of the bar by a coil spring 89. That is to say, the springs 89 are thus disposed in compression between the heads of the plungers and corresponding brackets 94 which are bolted to the top of the framework 84 at intervals and which thus serve to carry the plungers. When the shear 40 is operated the lower shear blade 60 is raised and comes in contact with the stripping bar 86, carrying it up to the top of the stroke, i. e. moving the bar upward until the lower blade has passed the central, highest region of the upper blade edge assembly (Fig. 3). Thus the inner or remaining edge of the paper strip (after the cut) is stripped from the upper blades and is free to fall (or to be carried by the stripper bar) to a position below them when the lower blade returns to its lower or open position.

There is also a guide member 90 (best shown in Fig. 2), in the shape of thin plate or sheet metal structure having a face 90a which extends completely across the path of the paper and which cooperates (e. g. with the stripper bar) to insure that the paper feeds smoothly through the opening made by the shear blades.

A specific embodiment of the invention has thus been shown and described by way of example but it is not to be taken as limiting in any way the scope of our invention, as defined by the appended claims.

We claim:

1. A shear comprising a frame, a first elongated blade having a rectilinear cutting edge along one of its long sides, guide means on said frame defining a linear path for movement of said blade so that said cutting edge moves in a predetermined plane, a second elongated blade having a cutting edge along one of its long sides, means on said frame supporting said second blade in a position in which the cutting edge thereof intersects said plane opposite the cutting edge of the first blade, said supporting means including means holding one portion of said second blade adjacent one end thereof on one side of said plane and yieldable means biasing another portion of said second blade to the other side of said plane, said second blade cutting edge extending diagonally with respect to the direction of movement of the first blade cutting edge, so that said edges contact each other only at one point at any given time, said yieldable means permitting movement of said other portion of said second blade through said plane by said first blade as it moves along said path, whereupon said one point of contact moves along said blades.

2. A shear as defined in claim 1, in which said means supporting the second blade comprises a fixed support extending parallel to said predetermined plane, a plurality of bolts threaded in said fixed support and extending freely through and beyond said second blade and having heads at their ends opposite said supports, said yieldable means comprises springs encircling said bolts and retained in compression between said heads and said second blade and biasing said second blade toward said support, and said holding means comprises an extension on said first blade projecting between said one portion of said second blade and said support and thick enough to hold said one portion on the side of said plane away from said support.

3. A shear as defined in claim 2, comprising a stripper bar slotted to receive said bolts, and supported thereon between and adjacent said second blade and said frame, said slots extending in the direction of movement of the blade to permit movement of the stripper bar upon engagement thereof by said first blade, and spring means biasing said stripper bar toward said first blade, said spring means being effective upon retraction of said first blade after a cutting stroke to move the stripper bar past the cutting edge of said second blade and thereby to remove any material adhering to said cutting edge.

4. A shear for sheet material, comprising a frame, a first horizontally elongated blade member, means supporting said first blade member on said frame for vertical movement with respect thereto, guide means on said frame defining a vertical path for movement of said blade member, said first blade member having two vertically projecting extensions at the ends of the blade member and a horizontal cutting edge along its upper side between said extensions, the path of said cutting edge as the blade member moves vertically defining a vertical plane whose location is determined by said guide means, second and third horizontally elongated blade members substantially half as long as said first blade member, means mounting said second and third blade members on said frame in end-to-end relation above said first blade member, each of said second and third blade members having a cutting edge extending along its lower side, said cutting edges of said second and third blade members being inclined slightly downwardly from the adjacent inner ends of said blade members toward their outer ends, said mounting means for said second and third blade members comprising means fixed on said frame at one side of said plane and extending therethrough and through said blade members to the opposite sides thereof, portions of said second and third blade members adjacent their outer ends being located at the opposite side of said plane so that said vertical extensions of the first blade member lie between the frame and said portions of said second and third blade members, and spring means on said fixed means biasing said second and third blade members toward said frame, so that the cutting edges of said second and third blade members intersect said predetermined plane at a small angle, and only one point on the cutting edge of each of said second and third blade members is in said plane at any given time, said first blade member being effective during upward movement thereof to engage its cutting edge against the edges of said second and third blade members at said points, and thereafter during continued upward movement to move the second and third blade members against said biasing means so as to gradually change said angle of intersection and to move said points of engagement progressively inwardly along said second and third blade members toward the inner ends thereof.

References Cited in the file of this patent

UNITED STATES PATENTS

| | | |
|---|---|---|
| 1,173,580 | Jennings | Feb. 29, 1916 |
| 2,163,868 | Christie | June 27, 1939 |
| 2,477,295 | Garwood | July 26, 1949 |